United States Patent
Moffett

(10) Patent No.: US 10,309,109 B2
(45) Date of Patent: Jun. 4, 2019

(54) METHOD AND APPARATUS FOR PANELS HAVING AN EMBEDMENT BRACKET

(71) Applicant: Manitowoc FSG Operations, LLC, New Port Richey, FL (US)

(72) Inventor: Anthony Ryan Moffett, Lexington, TN (US)

(73) Assignee: MANITOWOC FSG OPERATIONS, LLC, New Port Richey, FL (US)

( * ) Notice: Subject to any disclaimer, the term of this patent is extended or adjusted under 35 U.S.C. 154(b) by 0 days.

(21) Appl. No.: 15/637,128

(22) Filed: Jun. 29, 2017

(65) Prior Publication Data
US 2019/0003183 A1    Jan. 3, 2019

(51) Int. Cl.
| | |
|---|---|
| *E04C 5/16* | (2006.01) |
| *E04B 5/04* | (2006.01) |
| *B29C 44/34* | (2006.01) |
| *E04C 2/292* | (2006.01) |
| *E04C 2/08* | (2006.01) |
| *E04C 5/01* | (2006.01) |

(52) U.S. Cl.
CPC .......... *E04C 5/168* (2013.01); *B29C 44/3496* (2013.01); *E04B 5/04* (2013.01); *E04C 2/292* (2013.01); *E04C 2/08* (2013.01); *E04C 5/01* (2013.01)

(58) Field of Classification Search
CPC ... E04C 2/292; E04C 5/01; E04C 2/08; E04B 5/04; B29C 44/3496
USPC ..... 52/309.7, 309.8, 309.11, 309.14, 309.15, 52/309.16
See application file for complete search history.

(56) References Cited

U.S. PATENT DOCUMENTS

| | | | | |
|---|---|---|---|---|
| 3,344,574 A | * | 10/1967 | Palfey | E04C 2/34 428/120 |
| 3,397,496 A | * | 8/1968 | Sohns | E04B 1/54 52/284 |
| 3,535,844 A | * | 10/1970 | Glaros | E04C 2/296 52/309.9 |
| 3,611,653 A | * | 10/1971 | Zinn | E04B 2/7412 181/290 |

(Continued)

FOREIGN PATENT DOCUMENTS

| | | |
|---|---|---|
| EP | 1347111 A1 | 9/2003 |
| WO | 2016135103 A1 | 9/2016 |
| WO | 2017005625 A1 | 1/2017 |

OTHER PUBLICATIONS

International Search Report dated Jul. 13, 2018 for PCT application No. PCT/US2018/03449.

(Continued)

*Primary Examiner* — Brian E Glessner
*Assistant Examiner* — Adam G Barlow
(74) *Attorney, Agent, or Firm* — Ohlandt, Greeley, Ruggiero & Perle, LLP

(57) ABSTRACT

A panel of a structure is provided that includes a first layer of material, a second layer of material, a filler material between the first layer of material and the second layer of material, and a bracket connected to the first layer of material. The bracket has a bottom flange spaced from the first layer of material. The filler material is between the first layer of material and the bottom flange securing the first layer of material to the filler material to function as an anchor and to provide embedment strength.

15 Claims, 7 Drawing Sheets

(56) References Cited

U.S. PATENT DOCUMENTS

| | | | | |
|---|---|---|---|---|
| 3,708,380 | A * | 1/1973 | Niebylski | E04C 2/284 428/71 |
| 4,394,026 | A | 7/1983 | Kaiser et al. | |
| 4,671,032 | A * | 6/1987 | Reynolds | E04C 2/388 52/127.11 |
| 4,844,975 | A * | 7/1989 | Litzenberger | E04C 2/292 428/306.6 |
| 4,974,381 | A * | 12/1990 | Marks | E04C 2/044 52/309.12 |
| 5,285,615 | A * | 2/1994 | Gilmour | E04B 2/7412 52/781 |
| 5,373,678 | A * | 12/1994 | Hessen | E04C 2/292 52/309.2 |
| 5,502,939 | A * | 4/1996 | Zadok | E04B 1/6129 52/309.9 |
| 5,950,389 | A * | 9/1999 | Porter | E04B 1/6145 403/DIG. 15 |
| 6,085,485 | A * | 7/2000 | Murdock | E04B 7/20 52/309.11 |
| 6,119,427 | A * | 9/2000 | Wyman | E04B 1/12 52/127.11 |
| 7,739,844 | B2 | 6/2010 | Gharibeh et al. | |
| 7,836,660 | B2 | 11/2010 | Gharibeh et al. | |
| 8,176,690 | B2 * | 5/2012 | Stanley | E04B 1/14 52/274 |
| 8,615,946 | B2 * | 12/2013 | Oberg | E04B 2/58 52/309.15 |
| 9,156,599 | B2 * | 10/2015 | Gustavsson | B65D 81/00 |
| 2003/0033769 | A1 * | 2/2003 | Record | E04B 1/14 52/270 |
| 2005/0069600 | A1 | 3/2005 | Scolamiero et al. | |
| 2005/0252120 | A1 | 11/2005 | Haga | |
| 2005/0284060 | A1 * | 12/2005 | Ritchie | E04C 2/22 52/309.7 |
| 2006/0251851 | A1 * | 11/2006 | Bowman | E04B 5/043 428/71 |
| 2007/0148381 | A1 * | 6/2007 | Moser | B32B 3/06 428/34.1 |
| 2009/0022935 | A1 | 1/2009 | Hirose et al. | |
| 2009/0056255 | A1 * | 3/2009 | Barton | E04B 1/14 52/309.7 |
| 2011/0078973 | A1 * | 4/2011 | Oberg | E04D 3/3603 52/582.1 |
| 2011/0173925 | A1 * | 7/2011 | Brown | E04B 1/14 52/794.1 |
| 2011/0214391 | A1 * | 9/2011 | Guevara | C04B 16/08 52/800.1 |
| 2014/0059958 | A1 * | 3/2014 | Ratto Anduaga | E04C 2/288 52/309.3 |
| 2014/0059959 | A1 * | 3/2014 | Salazar | E04B 5/043 52/309.13 |
| 2014/0250812 | A1 * | 9/2014 | Gillman | E04F 13/0866 52/309.8 |
| 2014/0260031 | A1 * | 9/2014 | Salazar | E04C 2/22 52/309.16 |
| 2018/0209137 | A1 * | 7/2018 | Carlyon | E04C 2/292 |

OTHER PUBLICATIONS

Written Opinion dated Jul. 13, 2018 for PCT application No. PCT/US2018/03449.

* cited by examiner

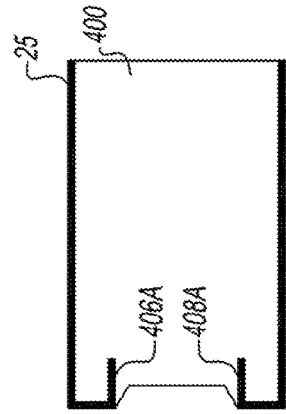
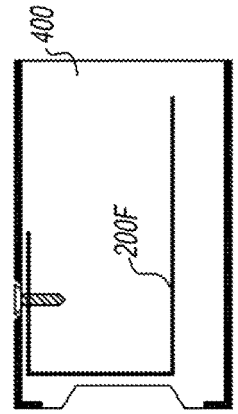
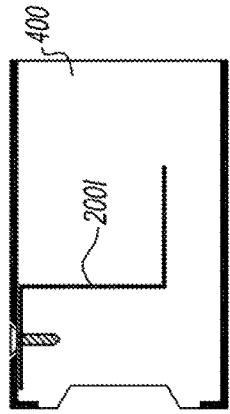
FIG. 4A  FIG. 4B  FIG. 4C
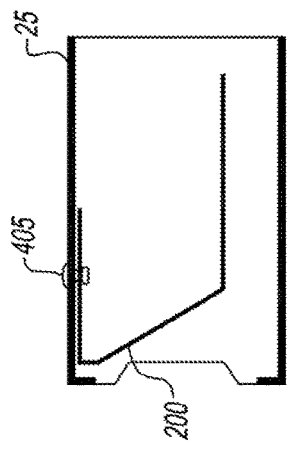
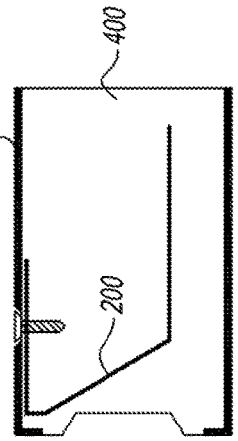
FIG. 4D  FIG. 4E  FIG. 4F
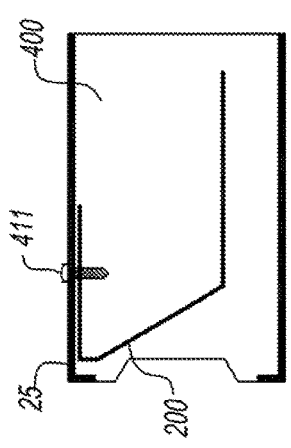
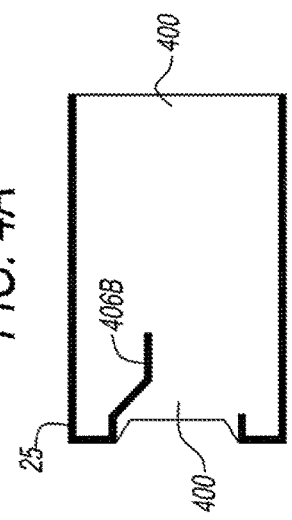
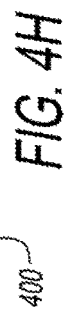
FIG. 4G  FIG. 4H  FIG. 4I

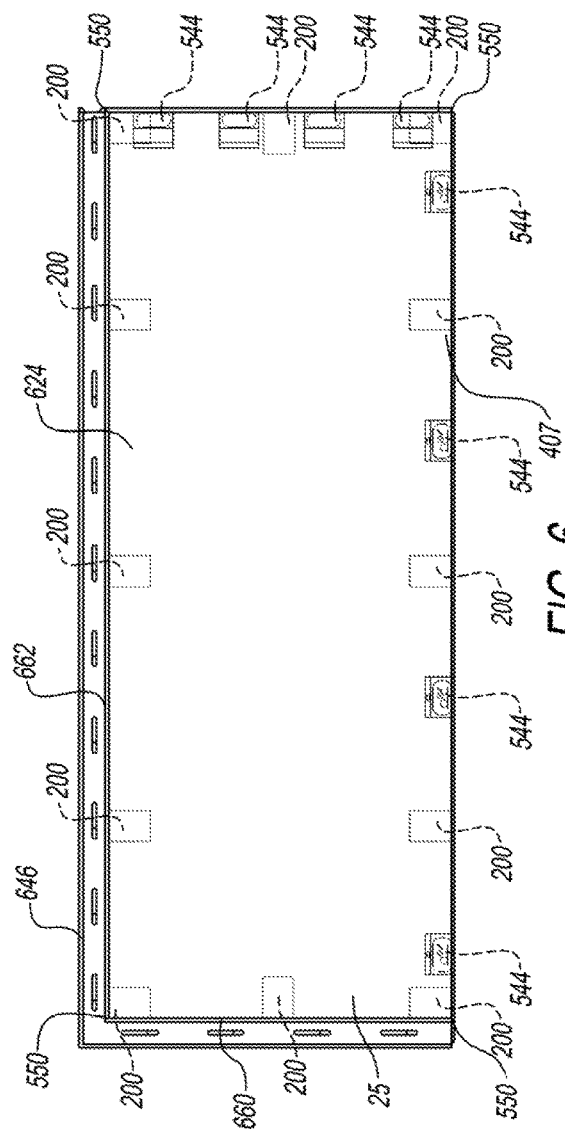
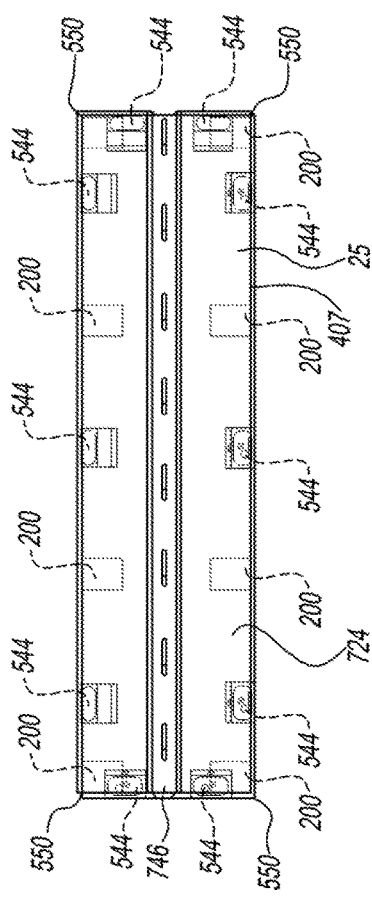

METHOD AND APPARATUS FOR PANELS HAVING AN EMBEDMENT BRACKET

BACKGROUND OF THE DISCLOSURE

1. Field of the Disclosure

The present disclosure relates to panels. More particularly, the present disclosure relates to a bracket that reduces delamination in panels, for example, of a walk-in freezer or cooler and method of making panels with the bracket.

2. Description of the Related Art

Walk-in cooler, refrigerator or freezer units are large, enclosed spaces used for storage. Perishable items such as food materials or flowers are commonly stored within these refrigerators or freezers. In operation, a user typically opens the insulated door and walks within the storage area of the refrigerator or freezer in order to add or remove stored items. The floor of the refrigerator or freezer is typically constructed with a top wear surface. This surface often needs to be reinforced when used with heavy loads. In particular, the wear surface should be reinforced when used with a heavy cart. Materials such as plywood can be used to reinforce the wear surface. There are certain disadvantages, however, with the use of previous walk-in refrigerator or freezer floor constructions. While the use of a plywood reinforcement material is advantageous because of the additional support that it provides, it can become detached or loosened from a surface.

Accordingly, there is a need to address these disadvantages of currently available systems.

SUMMARY OF THE DISCLOSURE

Panels, for example, for a floor of a walk-in refrigerator/freezer or cooler are provided that have one or more brackets strategically placed into the panels before they are filled with filler material, for example, one or more brackets are strategically placed into the panels before they are foamed. Once the filler material, for example, foam, cures, the brackets will be anchored in the filler material. The top floor metal skin will attach to each bracket so that if the top floor metal skin begins to delaminate from the panel, the bracket will hold the top floor metal skin in place on the panel. The bracket will be formed so that a section will mate with the top floor metal skin, then advance vertically downward into the filler material, and finally have a surface area under the filler material to function as an anchor and provide embedment strength to the bracket.

In particular, a panel is provided that includes a first layer of material, a second layer of material, a filler material layer between the first layer of material and the second layer of material, and a bracket connected to the first layer of material. The bracket has a bottom flange spaced from the first layer of material. The filler material is between the first layer of material and the bottom flange securing the first layer of material to the filler material.

The bracket can have a top flange connected to the first layer of material. The top flange can be spaced from the bottom flange so that filler material is between the top flange and the bottom flange securing the first layer of material to the filler material. The top flange can be connected to the bottom flange by a connector flange, and the connector flange can extend in a direction so that the top flange and the bottom flange are spaced apart. The connector flange can extend in a direction so that the bracket is spaced from a locking mechanism that connects the panel with another panel. The bracket is a non-linear shape such as a C-shape, a Z-shape, L-shape, a J-shape, or any other non-linear or single line geometry.

The bracket can have a length between 0.0001 inches and a length of the first layer of material. The bracket can be a material from the group consisting of metal, wood, plastic, ceramic, and any combination thereof. The bracket can have a thickness between 0.0001 inches and a thickness between the first layer of material and the second layer of material. The bracket can be connected to the first layer of material by an attachment selected from the group consisting of adhesives, tapes, glues, screws, rivets, nails, staples, and any combination thereof.

In an embodiment, the first layer of material can form a structure, such as a rectangle, and the bracket can be a plurality of brackets with one of the plurality of brackets positioned at each corner of the structure. The plurality of brackets can be placed at the perimeter of the structure, and the plurality of brackets can be less than 34.5 inches apart from one another. One of the plurality of brackets can be positioned between two corners of the structure. A receiving portion can also be included in the panel that connects the panel to a component selected from the group consisting of a floor, a wall, a ceiling, another panel, and any combination thereof, and the first layer of material can form a structure, so that one of the plurality of brackets is positioned at the receiving portion. The top flange can be connected to the bottom flange by a connector flange, and the filler material can contact at least 9 square inches of surface area of the bracket.

A method of making a panel is also provided that includes providing a first layer of material on a surface; providing a bracket having a bottom flange that is spaced from the first layer of material; connecting the bottom flange to the first layer of material; dispensing filler material between the bottom flange and the first layer of material; and placing a second layer of material on the filler material. A fastener, such as a screw or bolt, can be inserted through the first layer of material and a top flange.

The above-described and other advantages and features of the present disclosure will be appreciated and understood by those skilled in the art from the following detailed description, drawings, and appended claims.

BRIEF DESCRIPTION OF THE DRAWINGS

FIG. 4A is a partial cross-sectional view of a modified panel having the bracket of FIG. 2.

FIG. 4B is a partial cross-sectional view of a modified panel having the bracket of FIG. 2.

FIG. 4C is a partial cross-sectional view of a modified panel of the refrigerator/freezer or cooler having panels of FIG. 1.

FIG. 4D is a partial cross-sectional view of a modified panel of the refrigerator/freezer or cooler having panels of FIG. 1.

FIG. 4E is a partial cross-sectional view of a modified panel having the bracket of FIG. 2.

FIG. 4F is a partial cross-sectional view of a modified panel of the refrigerator/freezer or cooler having panels of FIG. 1.

FIG. 4G is a partial cross-sectional view of a modified panel of the refrigerator/freezer or cooler having panels of FIG. 1.

FIG. 4H is a partial cross-sectional view of a modified panel of the refrigerator/freezer or cooler having panels of FIG. 1.

FIG. 4I is a partial cross-sectional view of a modified panel of the refrigerator/freezer or cooler having panels of FIG. 1.

FIG. 6 is a top view of a panel having the brackets of FIG. 2 and showing the locations of the brackets and locations of panel to panel locking mechanism.

FIG. 7 is a top view of a panel having the brackets of FIG. 2 and showing the locations of the brackets and locations of panel to panel locking mechanism.

DETAILED DESCRIPTION OF THE DISCLOSURE

Figure 1:
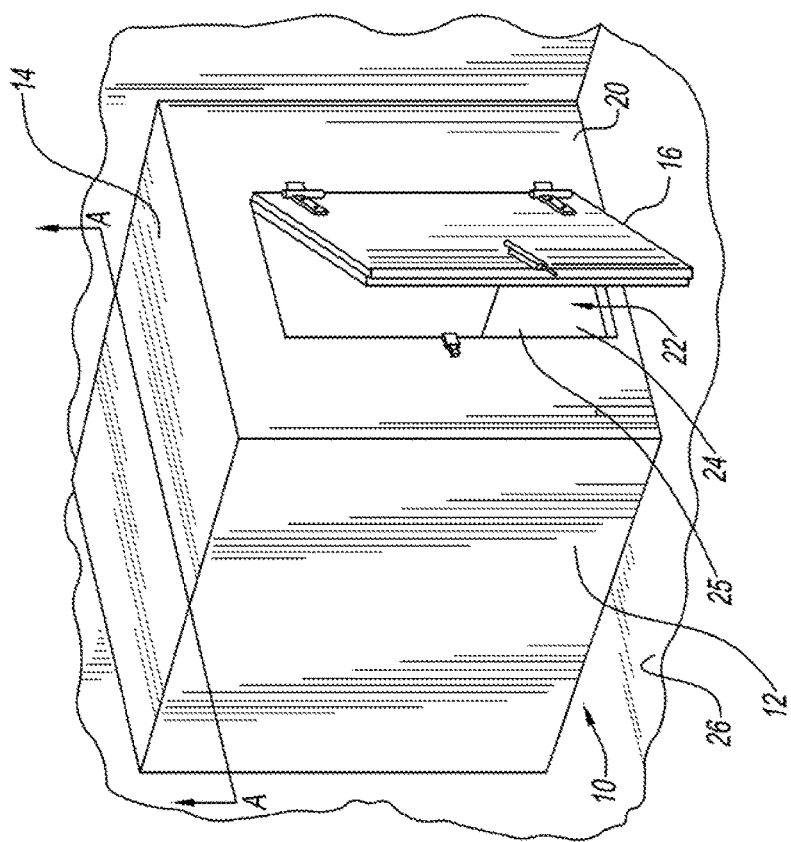
FIG. 1 is a top, front perspective view of a refrigerator/freezer or cooler having panels in accordance with the present disclosure.
Figure 1A:
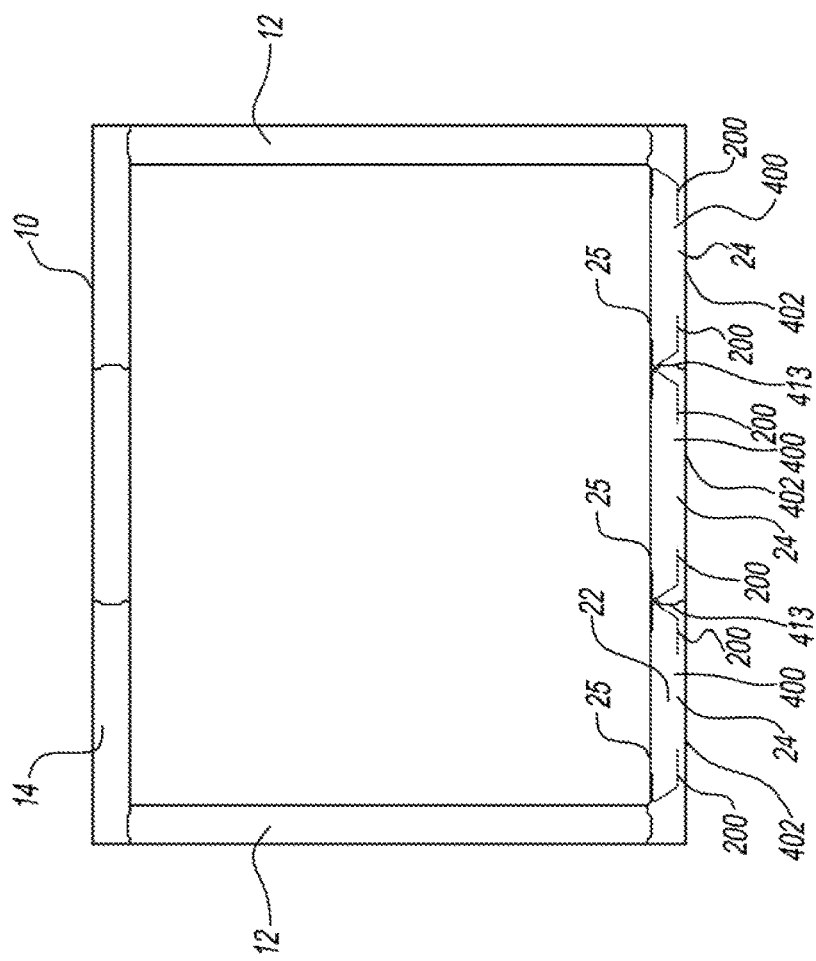
FIG. 1A is a side cross-sectional view taken along line A-A of FIG. 1 of the refrigerator/freezer or cooler having panels of FIG. 1.

Referring to FIGS. 1 and 1A, a walk-in refrigerator/freezer 10 is shown. The walk-in refrigerator/freezer 10 includes a plurality of side walls 12, a ceiling 14, and floor 22. A door 16 is shown attached to the front wall 20. The side walls 12, the ceiling 14, the door 16, and the front wall 20 are formed, in part, from an insulation material such as polyurethane with an outer surface, for example, formed from galvanized steel. Floor 22 is formed of panels 24 that are connected together. Each of panels 24 has a first layer of material 25, a filler material 400, one or more brackets 200, and a second layer of material 402. First layer of material 25 contacts feet, carts, dollies, beverage kegs, and the like. Brackets 200 are each a non-linear shape, which can be any non-linear shape except for a straight line. First layer of material 25, for example, is a metal skin. Walk-in refrigerator/freezer 10 is supported on a surface 26, for example, a concrete floor. Panel 24 is described herein as a floor panel; however, panel 24 can be a panel for a wall, ceiling, door, or any similar panel.

The refrigerator/freezer 10 is constructed having a rectangular configuration. However, panels 24 may be implemented in refrigerator/freezer configurations having a wide variety of shapes and sizes. Refrigerator/freezer 10 may be used with a conventional refrigeration systems. Alternatively, walk-in refrigerator/freezer 10 could be a cooler that does not include a refrigeration system.

Figure 3:
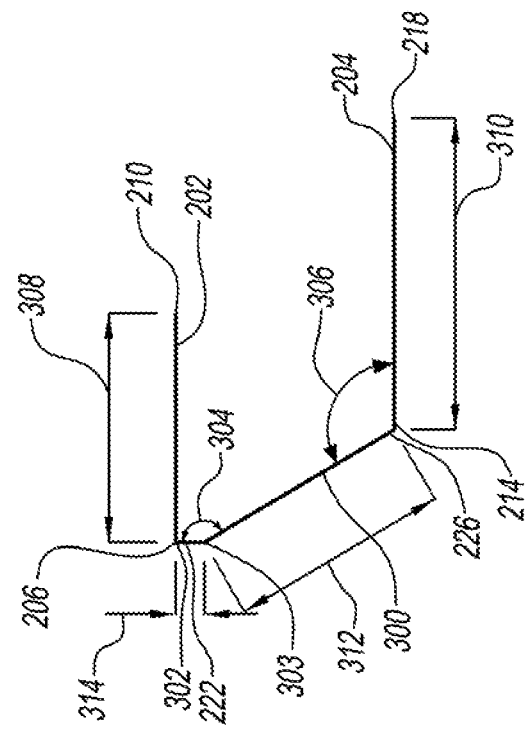
FIG. 3 is a cross-sectional view of the bracket of FIG. 2 taken along line 3-3 in FIG. 2.
Figure 2:
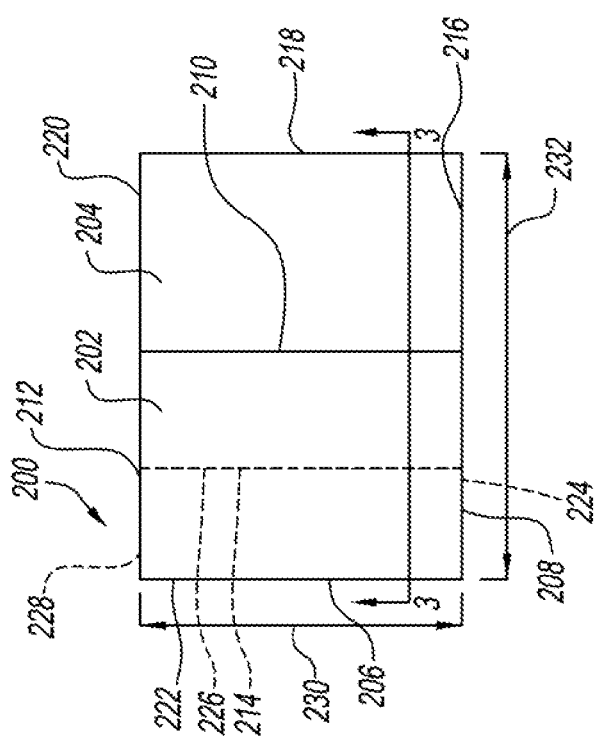
FIG. 2 is a top view of a bracket of the present disclosure.

Referring to FIGS. 2 and 3, bracket 200 of the present disclosure is shown that connects to first layer of material 25 of panel 24. Bracket 200 has a top flange 202 and a bottom flange 204. Top flange 202 and bottom flange 204 are connected by a connector flange 300. Top flange 202, bottom flange 204 and connector flange 300 each have a shape that is a rectangular sheet. Top flange 202 has side edges 206, 208, 210, 212. Bottom flange 204 has side edges 214, 216, 218, 220. Connector flange 300 has side edges 222, 224, 226, 228. Bracket 200 is made of a material, for example, metal, wood, plastic, ceramic, or other organic or synthetic substances, or any combination thereof. Bracket 200 can be made of 16 gauge galvanized or stainless steel.

In an exemplary embodiment, side edge 206 of top flange 202 connects to side edge 222 of connector flange 300 forming an angle 302. Angle 302 is a 90 degree angle. Connector flange 300 forms a bend 303 at an angle 304. Angle 304 is a 150 degree angle. Side edge 214 of bottom flange 204 connects to side edge 226 of connector flange 300 forming an angle 306. Angle 306 is a 120 degree angle. Side edges 206, 210 of top flange 202, side edges 214, 218 of bottom flange 204, and side edges 222, 226 of connector flange 300 each have a length 230 of 4 inches. Bracket 200 has a width 232 of 5.375 inches from side edge 214 of top flange 202 to side edge 218 bottom flange 204. Top flange 202 has a width 308 of 2.785 inches from side edge 206 to side edge 210. Bottom flange 204 has a width 310 of 4.0 inches from side edge 214 to side edge 218. Connector flange 300 has a width 312 of 2.75 inches from side edge 222 to side edge 226. Bracket 200 has a distance 314 of 0.375 inches between side edge 222 of connector flange 300 and bend 303.

Figure 4:
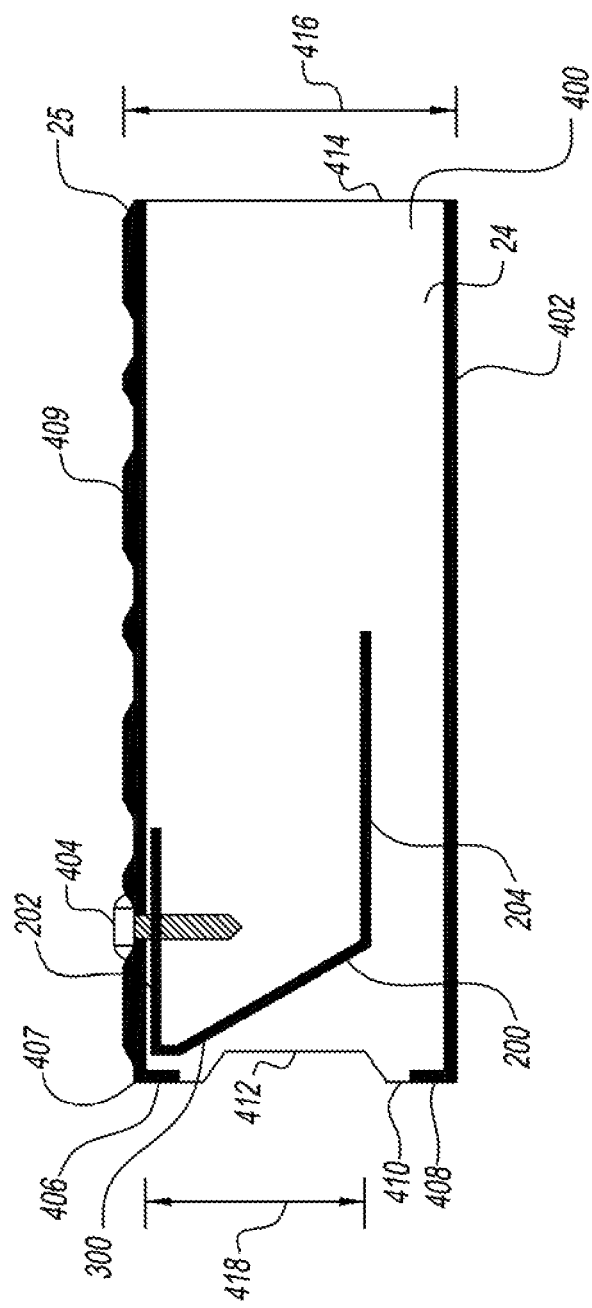
FIG. 4 is a partial cross-sectional view of a panel having the bracket of FIG. 2.

Referring to FIG. 4, exemplary panel 24 has first layer of material 25, filler material 400, and second layer of material 402. Second layer of material 402, for example, is a metal skin. First layer of material 25 and second layer of material 402 are, for example, galvanized steel, aluminum, plastic, reinforced plastic, wood, galvanized steel with tile covering or any combination thereof. Filler material 400 is, for example, foam such as a polyurethane foam. First layer of material 25 has treads 409, alternatively, first layer of material 25 can be smooth as shown in FIG. 4E.

Top flange 202 of bracket 200 is connected to first layer of material 25 by an attachment, for example, by a screw 404. Alternatively, the attachment connecting top flange 202 of bracket 200 to first layer of material 25 could be adhesives, tapes, glues, rivets 405 (FIG. 4B), nails 411 (FIG. 4A), staples, or any combination thereof. It has been found by the inventors of the present disclosure that it is optimal to use at least one mechanical fastener to attach each bracket 200 to first layer of material 25. Bracket 200 has bottom flange 204 spaced from first layer of material 25 with filler material 400 between first layer of material 25 and the bottom flange 204 to secure first layer of material 25 to filler material 400. Screw 404 is through first layer of material 25, top flange 202 and filler material 400. Screw 404 further secures first layer of material 25 to filler material 400. First layer of material 25 and second layer of material 402 are each connected to filler material 400 by an adhesive property in filler material.

First layer of material 25 has an edge wall 406 surrounding the entire perimeter 407 of first layer of material 25. Second layer of material 402 has an edge wall 408 surrounding the perimeter in whole or in part of second layer of material 402. Edge walls 406, 408 could be segmented or omitted. Bracket 200 is positioned adjacent edge wall 406 of first layer of material 25. At one or more side portions 410 of filler material 400 between edge wall 406 of first layer of material 25 and edge wall 408 of second layer of material 402 a groove 412 or tongue 413 (FIG. 1A) is formed in filler material 400. Groove 412 is a part of a connection device or locking mechanism described herein that receives tongue 413 that is a mating portion of another of panels 24 to connect the two panels 24. Alternatively, edge wall 406 and edge wall 408 have an L-shape sometimes referred to as a "double-ninety" configuration as shown by reference numbers 406A, 408A in FIG. 4C. In another alternative first layer of material 25 has a Z-shape portion 406B connected to edge wall 406 as shown in FIG. 4D. It is possible that first layer of material 25 that has Z-shape portion 406B connected to edge wall 406 may omit bracket 200.

Exemplary panel 24 has a thickness 416 of 2.0 inches to 6.0 inches.

It has been determined by the inventors of the present disclosure that it is advantageous to place bracket 200 adjacent perimeter 407 of first layer of material 25. To achieve the placement of bracket 200 adjacent perimeter 407 of first layer of material 25, the inventors developed bracket 200 having a shape with connector flange 300 that does not to come into contact, and, in other words, avoids groove 412 as well as positions bottom flange 204 so as to avoid groove 412 allowing both placement of bracket 200 adjacent perimeter 407 of first layer of material 25 as well as use of groove 412 to connect two or more of panels 24. This shape allows bracket 200 that is non-linear to be placed closer to perimeter 407. Other shapes of bracket 200 may be used, for example, C-shaped bracket 200F (FIG. 4F), Z-shaped bracket 200G (FIG. 4G), J-shaped bracket 200H (FIG. 4H), L-shape bracket 200I (FIG. 4I) or other shapes with different dimensions, angles, thicknesses, or materials in different locations would also produce the concept of anchoring in filler material 400 and attaching to the top metal skin first layer of material 25.

Figure 5:
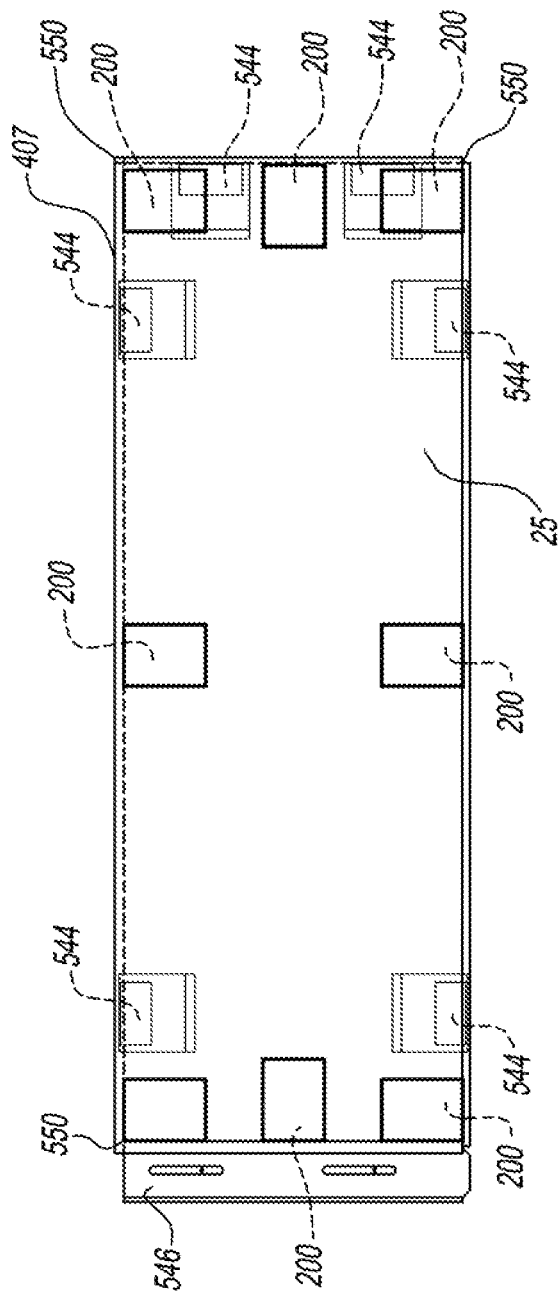
FIG. 5 is a top view of a panel having the brackets of FIG. 2 and showing the locations of the brackets and locations of panel to panel locking mechanism.

Referring to FIG. 5, a panel 524 of the present disclosure is shown. Panel 524 is the same as panel 24 except panel 524 has first layer of material 25 that is smooth, has locking mechanisms 544, and has a wall connector 546 and positions brackets 200 at each corner 550 and between each corners 550. Components of panel 524 that are the same as panel 24 are referenced using the same reference numerals herein. Brackets 200 are positioned adjacent perimeter 407 of first layer of material 25 at corners 550 and one of brackets 200 is between each of two corners 550. Locking mechanisms 544 connect panel 524 to another panel, for example, panel 24 or panel 524. Wall connector 546 connects one of side walls 12 to panel 524. Locking mechanisms 544 and wall connector 546 are connected to filler material 400, first layer of material 25, second layer of material 402, or any combination thereof.

Referring to FIG. 6, a panel 624 of the present disclosure is shown. Panel 624 is the same as panel 524 except has a wall connector 646, instead of wall connector 546, positions more than one of brackets 200 between each corners 550, and includes more locking mechanisms 544. Components of panel 624 that are the same as panels 24, 524 are referenced using the same reference numerals herein. Wall connector 646 connects to two of side walls 12 on adjacent sides 660, 662 of panel 624.

Referring to FIG. 7, a panel 724 of the present disclosure is shown. Panel 724 is the same as panel 524 except has a wall connector 746, instead of wall connector 546, positions more than one of brackets 200 between each corners 550 and includes more locking mechanisms 544. Components of panel 724 that are the same as panels 24, 524 are referenced using the same reference numerals herein. Wall connector 746 connects to an interior wall (not shown) of walk-in refrigerator/freezer 10 so that panel 724 extends on opposite sides of the interior wall.

It has been determined by the inventors of the present disclosure that it is advantageous to place bracket 200 adjacent perimeter 407 of first layer of material 25 so that brackets 200 are in all corners of panels 24, 524, 624, 724, for example, all four corners of a panel having a rectangular shape. It has also been determined by the inventors of the present disclosure that it is advantageous to place bracket 200 adjacent perimeter 407 of first layer of material 25 so that brackets 200 are in a middle of each side. It has additionally been determined by the inventors of the present disclosure that it is advantageous to place bracket 200 adjacent perimeter 407 of first layer of material 25 so that brackets 200 are less than 34.5 inches apart, in other words, between two of brackets 200.

Bracket 200 has length 230, for example, ranging from 0.0001 inch long and up to a length of panels 24, 524, 624, 724. Bracket 200 has thickness 418, for example, ranging from 0.0001 inch long and up to thickness 416 of panels 24, 524, 624, 724. One example of bracket 200 has a 4 square inch top flange 202 having a flat surface that attaches to first layer of material 25, connector flange 300 breaks downward from top flange 202 in a way that would miss locking mechanisms 412, embed bracket 200 so that bottom flange 402, for example, is 0.75 inches above second layer of material 402, and have at least a 9 square inch total surface area including the surface area of top flange 202, connector flange 300 and bottom flange 204, for embedment strength.

Referring back to FIG. 4, panels 24, 524, 624, 724 can be manufactured by placing first layer of material 25 on a surface, and, before panel 24, 524, 624, 724 is filled with filler material, for example, foamed, brackets 200 will be strategically placed around perimeter 407. Bottom flange 204 is connected to first layer of material 25 to be held in place. Brackets 200 are typically held in place, for example, by adhesive, double-sided tape, fastener (for example, screw 404), or combination thereof, connecting top flange 202 to first layer of material 25. Filler material 400 is, then, dispensed between top flange 202 and bottom flange 204. Second layer of material 402 is then placed on filler material 400. Brackets 200 will be anchored in filler material 400 once filler material 400 cures. After filler material cures, panels 24, 524, 624, 724 are turned right side up from being up-side-down during manufacturing.

Panels 24, 524, 624, 724 for use in walk-in refrigerator/freezer 10 for example, can also be used for carts, dollies, and the like. To replace those costly reinforcements that are typically used, for example, plywood, anti-delamination anchor brackets, brackets 200, will be strategically placed into panels 24, 524, 624, 724 including around perimeter 407 before panel 24, 524, 624, 724 is filled with filler material. Once filler material 400 cures, brackets 200 will be anchored in filler material 400. The top floor metal skin, first layer of material 25, will attach to each bracket 200 so that if first layer of material 25 begins to delaminate from panel 24, 524, 624, 724, bracket 200 will hold first layer of material 25 in place on panel 24, 524, 624, 724. Bracket 200 will be formed so that a section will mate to first layer of material 25, then advance vertically downward into filler material 400, and finally have a surface area under filler material 400 so as to function as an anchor and provide embedment strength to bracket 200. Using bracket 200 will allow other more expensive reinforcement materials to be omitted saving material and labor costs as well as reducing a weight of panel 24, 524, 624, 724 and simplifying installation of walk-in refrigerator/freezer 10. Brackets 200 do not require additional width in contrast to some reinforcement materials, for example, plywood, that require the panels to have a greater width.

The present disclosure having been thus described with particular reference to the preferred forms thereof, it will be obvious that various changes and modifications may be made therein without departing from the spirit and scope of the present invention as defined in the appended claims.

It should be noted that the terms "first", "second", "third", "fourth", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure will not be limited to the particular embodiment(s) disclosed as the best mode contemplated, but that the disclosure will include all embodiments falling within the scope of the appended claims.

The invention claimed is:

1. A panel comprising:
a first layer of material;
a second layer of material;
a filler material between the first layer of material and the second layer of material; and
a bracket connected to the first layer of material, the bracket having a top flange connected to the first layer of material and a bottom flange spaced from both the first layer of material and the second layer of material and wherein the top flange is connected to the bottom flange by a connector flange, wherein the top flange is connected adjacent a perimeter of the first layer of material and the connector flange extends in a direction away from a locking mechanism that connects the panel with another panel so that the connector flange and bottom flange are spaced from the locking mechanism, the filler material being between the first layer of material and the bottom flange securing the first layer of material to the filler material, the filler material being between the second layer of material and the bottom flange.

2. The panel of claim 1, wherein the bracket has a non-linear shape.

3. The panel of claim 1, wherein the top flange is spaced from the bottom flange so that the filler material is between the top flange and the bottom flange securing the first layer of material to the filler material.

4. The panel of claim 1, wherein the connector flange extends in a direction so that the top flange and the bottom flange are spaced apart.

5. The panel of claim 1, wherein the bracket forms a Z-shape.

6. The panel of claim 1, wherein the bracket forms a J-shape.

7. The panel of claim 1, wherein the bracket has a length between 0.0001 inches and a length of the first layer of material.

8. The panel of claim 1, wherein the bracket is a material from the group consisting of metal, wood, plastic, ceramic, and any combination thereof.

9. The panel of claim 1, wherein the bracket has a thickness between 0.0001 inches and a thickness between the first layer of material and the second layer of material.

10. The panel of claim 1, wherein the bracket is connected to the first layer of material by an attachment selected from the group consisting of adhesives, tapes, glues, screws, rivets, nails, staples, and any combination thereof.

11. The panel of claim 1, wherein the first layer of material forms a structure, wherein the bracket is a plurality of brackets, and wherein one of the plurality of brackets is positioned at each corner of the structure.

12. The panel of claim 11, wherein one of the plurality of brackets is positioned between two corners of the structure.

13. The panel of claim 1, further comprising a receiving portion that connects the panel to a component selected from the group consisting of a floor, a wall, a ceiling, another panel, and any combination thereof, wherein the first layer of material forms a structure, wherein the bracket is a plurality of brackets, and wherein one of the plurality of brackets is positioned at the receiving portion.

14. A method of making the panel of claim 1 for making a panel, the method comprising:
providing the first layer of material on a surface;
providing the bracket having the bottom flange that is spaced from the first layer of material;
connecting the bottom flange to the first layer of material;
dispensing the filler material between the bottom flange and the first layer of material;
placing the second layer of material on the filler material.

15. The method of claim 14, further comprising inserting a fastener through the first layer of material and the top flange.

* * * * *